(12) United States Patent
Song

(10) Patent No.: US 11,618,431 B2
(45) Date of Patent: Apr. 4, 2023

(54) HYBRID VEHICLE CONTROLLING DEVICE AND METHOD THEREOF

(71) Applicants: HYUNDAI MOTOR COMPANY, Seoul (KR); KIA MOTORS CORPORATION, Seoul (KR)

(72) Inventor: Min Seok Song, Gwacheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 108 days.

(21) Appl. No.: 16/393,738

(22) Filed: Apr. 24, 2019

(65) Prior Publication Data

US 2020/0148189 A1    May 14, 2020

(30) Foreign Application Priority Data

Nov. 14, 2018  (KR) .................. 10-2018-0140078

(51) Int. Cl.

| | |
|---|---|
| *B60W 20/12* | (2016.01) |
| *B60W 20/18* | (2016.01) |
| *B60W 20/11* | (2016.01) |
| *B60W 40/105* | (2012.01) |
| *G08G 1/0968* | (2006.01) |
| *B60W 20/13* | (2016.01) |

(52) U.S. Cl.
CPC ............ *B60W 20/12* (2016.01); *B60W 20/11* (2016.01); *B60W 20/13* (2016.01); *B60W 20/18* (2016.01); *B60W 40/105* (2013.01); *G08G 1/096827* (2013.01); *B60W 2552/00* (2020.02); *B60W 2720/10* (2013.01)

(58) Field of Classification Search
CPC . B60W 2050/0077; B60W 2050/0089; B60W 20/11; B60W 20/12; B60W 20/13; B60W 20/18; B60W 2520/10; B60W 2540/30; B60W 2552/00; B60W 2552/10; B60W 2556/40; B60W 2556/50; B60W 2720/10; B60W 40/105; B60W 2050/0075; G08G 1/096827

See application file for complete search history.

(56) References Cited

U.S. PATENT DOCUMENTS 5,913,917 A * 6/1999 Murphy ............... B60R 16/0232
                                                              701/123
6,317,686 B1 * 11/2001 Ran ....................... G08G 1/0141
                                                              73/178 R (Continued)

FOREIGN PATENT DOCUMENTS

JP    2004-248455 A    9/2004
KR  10-2015-0001984 A   1/2015

*Primary Examiner* — Babar Sarwar
(74) *Attorney, Agent, or Firm* — Fox Rothschild LLP

(57) ABSTRACT

A device for controlling a hybrid vehicle includes a storage storing a map in which an on reference value and an off reference value of an engine are recorded, a navigation device setting a route from a current location to a destination, a transceiver receiving a speed profile for each section on the route, and a controller dividing the route into a plurality of sections and correcting the map based on the received speed profile for each section to correct a map for (Continued)

determining an on time point and an off time point of an engine based on the speed profile most similar to the driving style of a driver.

12 Claims, 7 Drawing Sheets

(56) References Cited

U.S. PATENT DOCUMENTS

| | | | | |
|---|---|---|---|---|
| 6,467,337 B2* | 10/2002 | Sadahiro | ............... | G01F 9/008 |
| | | | | 701/123 |
| 7,999,664 B2* | 8/2011 | Barajas | ............... | B60R 25/00 |
| | | | | 701/123 |
| 8,346,456 B2* | 1/2013 | Aleksic | ............ | B60W 50/0097 |
| | | | | 701/25 |
| 9,162,679 B2* | 10/2015 | Sujan | ............... | B60W 30/1882 |
| 9,573,483 B2 | 2/2017 | Choi et al. | | |
| 2011/0166731 A1* | 7/2011 | Kristinsson | ............ | B60W 10/26 |
| | | | | 180/65.265 |
| 2013/0325335 A1* | 12/2013 | Kee | ............... | G01C 21/3469 |
| | | | | 701/527 |
| 2014/0074386 A1* | 3/2014 | McGee | ............ | B60W 50/0097 |
| | | | | 903/902 |
| 2014/0277835 A1* | 9/2014 | Filev | ............... | G06F 17/00 |
| | | | | 701/2 |
| 2014/0277971 A1* | 9/2014 | Oshiro | ............... | B60W 50/14 |
| | | | | 701/99 |
| 2015/0005998 A1* | 1/2015 | Choi | ............... | B60W 10/26 |
| | | | | 903/903 |
| 2015/0224990 A1* | 8/2015 | Kim | ............... | B60W 50/0097 |
| | | | | 701/93 |
| 2015/0239454 A1* | 8/2015 | Sujan | ............... | F02D 29/02 |
| | | | | 701/54 |
| 2016/0237925 A1* | 8/2016 | Lee | ............... | F02D 41/401 |
| 2017/0043776 A1* | 2/2017 | Sujan | ............... | B60W 30/188 |
| 2018/0046184 A1* | 2/2018 | Subramanian | ...... | B60W 30/1882 |
| 2018/0208174 A1* | 7/2018 | Kim | ............... | B60W 50/0097 |
| 2018/0339697 A1* | 11/2018 | Ogawa | ............... | B60W 20/12 |
| 2019/0049959 A1* | 2/2019 | Gaither | ............... | B60W 50/085 |
| 2019/0168742 A1* | 6/2019 | Song | ............... | B60W 20/20 |
| 2019/0184976 A1* | 6/2019 | Kim | ............... | B60W 20/20 |
| 2019/0375403 A1* | 12/2019 | Hu | ............... | B60W 30/165 |

* cited by examiner

HYBRID VEHICLE CONTROLLING DEVICE AND METHOD THEREOF

CROSS-REFERENCE TO RELATED APPLICATION

This application claims the benefit of priority to Korean Patent Application No. 10-2018-0140078, filed in the Korean Intellectual Property Office on Nov. 14, 2018, the entire contents of which are incorporated herein by reference.

TECHNICAL FIELD

The present disclosure relates to a device and a method of controlling a hybrid vehicle.

BACKGROUND

Generally, a hybrid vehicle is driven by efficiently combining two or more different power sources. In most cases, the hybrid vehicle refers to a vehicle that obtains the driving force through an engine driven by burning fuel (fossil fuel such as gasoline) and an electric motor driven by the electric power of the battery.

The hybrid vehicle may be implemented with various structures by using an engine and an electric motor as a power source. The hybrid vehicle that directly transfers the mechanical power of the engine to the wheels and is assisted by an electric motor powered by the battery when needed may be referred to as a "parallel hybrid vehicle". On the other hand, the hybrid vehicle that changes the mechanical power of the engine to electric power through a generator to drive the electric motor or to charge the battery may be referred to as a "series hybrid vehicle". In general, the parallel hybrid vehicle is advantageous for high-speed driving or long-distance driving, and the series hybrid vehicle is advantageous for driving in the city or short-distance driving.

In recent years, a Plug-in Hybrid Electric Vehicle (PHEV), in which the capacity of a battery charged from an external power source is manufactured to be greater than that of a conventional hybrid vehicle and which drives only in an EV mode for short-distance driving and drives in a HEV mode when the battery is exhausted, has been developed. That is, the PHEV may be equipped with an internal combustion engine driven by gasoline and a battery engine, like a conventional hybrid vehicle and may be capable of being driven by using either or both of them. However, the PHEV may be equipped with a high-capacity and high-voltage battery and may be capable of being charged with external electricity.

The disclosure of this section is to provide background of the invention. Applicant notes that this section may contain information available before this application. However, by providing this section, Applicant does not admit that any information contained in this section constitutes prior art.

SUMMARY

An aspect of the present disclosure provides a device for controlling a hybrid vehicle that divides the route to the destination into a plurality of sections, receives a plurality of speed profiles for each section from a server, and corrects a map for determining the on-time and off-time of the engine based on the speed profile most similar to the driving style of the driver, and thus may reduce the on-time of the engine by predicting the acceleration of the driver and may reduce the off-time of the engine by predicting the deceleration of the driver, and a method thereof.

According to an aspect of the present disclosure, a hybrid vehicle controlling device includes a storage storing a map in which an on reference value and an off reference value of an engine are recorded, a navigation device setting a route from a current location to a destination, a transceiver receiving a speed profile for each section on the route, and a controller dividing the route into a plurality of sections and correcting the map based on the received speed profile for each section.

According to an aspect of the present disclosure, the transceiver is configured to receive a speed profile for a corresponding section at a time of entering each section.

According to an aspect of the present disclosure, the controller is configured to divide the route starting from at least one of Interchange (IC), Junction (JC), a point at which the number of lanes increases, or a point at which the number of lanes decreases.

According to an aspect of the present disclosure, the controller is configured to select one speed profile the most similar to a driving style of a driver of a host vehicle, when receiving a plurality of speed profiles for each section.

According to an aspect of the present disclosure, the transceiver is further configured to receive an average speed and an average acceleration of other vehicles that drive on a reference road.

According to an aspect of the present disclosure, the controller is configured to select one speed profile that is the most similar to a driving style of the driver of the host vehicle by using the average speed and the average acceleration of the other vehicles driving on the reference road, an average speed and an average acceleration of the host vehicle driving on the reference road, an average speed of each speed profile for each section and an average speed of a plurality of speed profiles, and an average acceleration of each speed profile for each section and an average acceleration of the plurality of speed profiles.

According to an aspect of the present disclosure, the controller is configured to display a value $S_{xr}$ for subtracting the average speed of the host vehicle driving on the reference road from the average speed of the other vehicles driving on the reference road and a value $S_{yr}$ for subtracting the average acceleration of the host vehicle driving on the reference road from the average acceleration of the other vehicles driving on the reference road, on coordinates ($S_x$, $S_y$) as a location of the host vehicle, to display a value $S_{x1}$ from subtracting an average speed of a first speed profile from the average speed of the plurality of speed profiles and a value $S_{y1}$ from subtracting an average acceleration of the first speed profile from the average acceleration of the plurality of speed profiles, on the coordinates ($S_x$, $S_y$), to display a value $S_{x2}$ from subtracting an average speed of a second speed profile from the average speed of the plurality of speed profiles and a value $S_{y2}$ from subtracting an average acceleration of the second speed profile from the average acceleration of the plurality of speed profiles, on the coordinates ($S_x$, $S_y$), and to select a speed profile positioned closest to the location of the host vehicle.

According to an aspect of the present disclosure, the controller is configured to correct the map based on the selected speed profile. At this time, the controller is configured to correct the on reference value by subtracting a first value, which is obtained by multiplying a second value from subtracting a current speed from a speed of the speed profile by an on correction factor, from the on reference value.

Moreover, the controller is configured to correct the off reference value by adding a first value, which is obtained by multiplying a second value from subtracting a speed of the speed profile from a current speed by an off correction factor, and the off reference value.

According to an aspect of the present disclosure, a method of controlling a hybrid vehicle includes storing, by a storage, a map in which an on reference value and an off reference value of an engine are recorded, setting, by a navigation device, a route from a current location to a destination, dividing, by a controller, the route into a plurality of sections, receiving, by a transceiver, a speed profile for each section on the route, and correcting, by the controller, the map based on the received speed profile for each section.

According to an aspect of the present disclosure, the receiving includes receiving a speed profile for a corresponding section at a time of entering each section.

According to an aspect of the present disclosure, the dividing includes dividing the route starting from at least one of IC, JC, a point at which the number of lanes increases, or a point at which the number of lanes decreases.

According to an aspect of the present disclosure, the receiving includes selecting one speed profile the most similar to a driving style of a driver of a host vehicle, when receiving a plurality of speed profiles for each section.

According to an aspect of the present disclosure, the method further includes receiving, by the transceiver, an average speed and an average acceleration of other vehicles that drive on a reference road.

According to an aspect of the present disclosure, the selecting includes selecting one speed profile that is the most similar to a driving style of the driver of the host vehicle by using the average speed and the average acceleration of the other vehicles driving on the reference road, an average speed and an average acceleration of the host vehicle driving on the reference road, an average speed of each speed profile for each section and an average speed of a plurality of speed profiles, and an average acceleration of each speed profile for each section and an average acceleration of the plurality of speed profiles.

According to an aspect of the present disclosure, the selecting includes displaying a value $S_{xr}$ for subtracting the average speed of the host vehicle driving on the reference road from the average speed of the other vehicles driving on the reference road and a value $S_{yr}$ for subtracting the average acceleration of the host vehicle driving on the reference road from the average acceleration of the other vehicles driving on the reference road, on coordinates $(S_x, S_y)$ as a location of the host vehicle, displaying a value $S_{x1}$ from subtracting an average speed of a first speed profile from the average speed of the plurality of speed profiles and a value $S_{y1}$ from subtracting an average acceleration of the first speed profile from the average acceleration of the plurality of speed profiles, on the coordinates $(S_x, S_y)$, displaying a value $S_{x2}$ from subtracting an average speed of a second speed profile from the average speed of the plurality of speed profiles and a value $S_{y2}$ from subtracting an average acceleration of the second speed profile from the average acceleration of the plurality of speed profiles, on the coordinates $(S_x, S_y)$, and selecting a speed profile positioned closest to the location of the host vehicle.

According to an aspect of the present disclosure, the correcting includes correcting the map based on the selected speed profile. At this time, the correcting includes correcting the on reference value by subtracting a first value, which is obtained by multiplying a second value from subtracting a current speed from a speed of the speed profile by an on correction factor, from the on reference value. Moreover, the correcting includes correcting the off reference value by adding a first value, which is obtained by multiplying a second value from subtracting a speed of the speed profile from a current speed by an off correction factor, and the off reference value.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
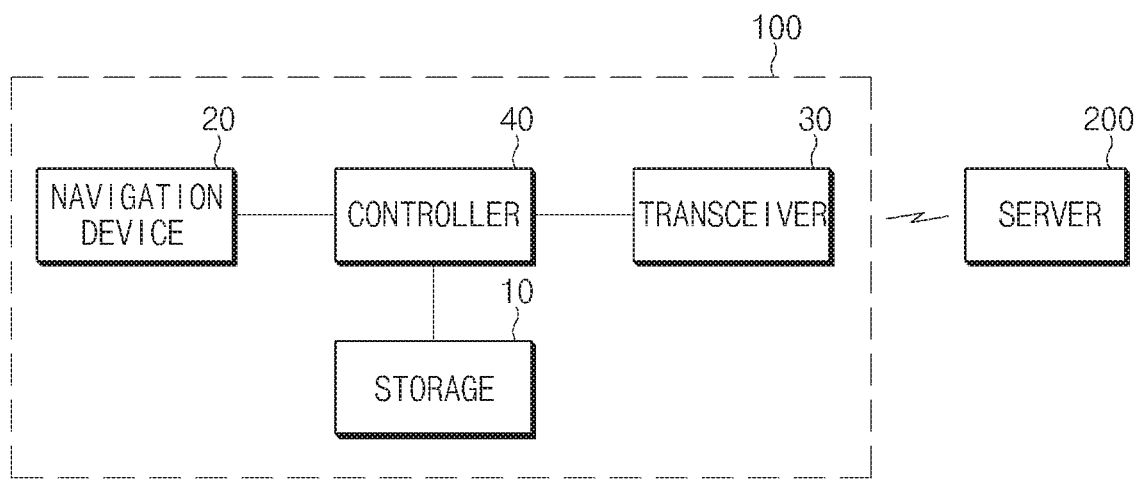
FIG. 1 is a block diagram of a hybrid vehicle controlling device, according to an embodiment of the present disclosure.

Hereinafter, embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

A hybrid vehicle may include an engine and a motor directly connected to each other as a driving source, and may include an inverter, a high-voltage battery, or the like that drives a clutch, transmission, the engine, the motor, and the like for power transmission. Furthermore, the hybrid vehicle may include a Hybrid Control Unit (HCU), a Motor Control Unit (MCU), and a Battery Management System (BMS), which are connected to each other to communicate through controller area network (CAN) communication, as a control means.

In an implementation of a hybrid vehicle, a controlling device of the hybrid vehicle determines the on/off-time of the engine based on a map in which both a reference value (hereinafter referred to as "on reference value") for determining the on-time of the engine and a reference value (hereinafter referred to as "off reference value") for determining the off-time of the engine are recorded. For example, the controlling device turns on the engine when the requested power of the driver exceeds the on reference value, and turns off the engine when the requested power of the driver is less than the off reference value.

FIG. 1 is a block diagram of a hybrid vehicle controlling device, according to an embodiment of the present disclosure.

As illustrated in in FIG. 1, a hybrid vehicle controlling device 100 may include storage 10, a navigation device 20, a transceiver 30, a controller 40, or the like. According to a method of operating a hybrid vehicle controlling device according to an embodiment of the present disclosure, each of the components may be provided as one device after being combined with one another; and a part of components may be omitted depending on the method of operating a hybrid vehicle controlling device according to an embodiment of the present disclosure.

Referring to each of the components, first, the storage 10 may store logic, an algorithm, and a program that divide the route to the destination into a plurality of sections, receive a plurality of speed profiles for each section from a server 200, and correct a map for determining the on-time and off-time of the engine based on the speed profile most similar to the driving style of the driver, to reduce the on-time of the engine by predicting the acceleration of the driver and to reduce the off-time of the engine by predicting the deceleration of the driver.

Figure 5:
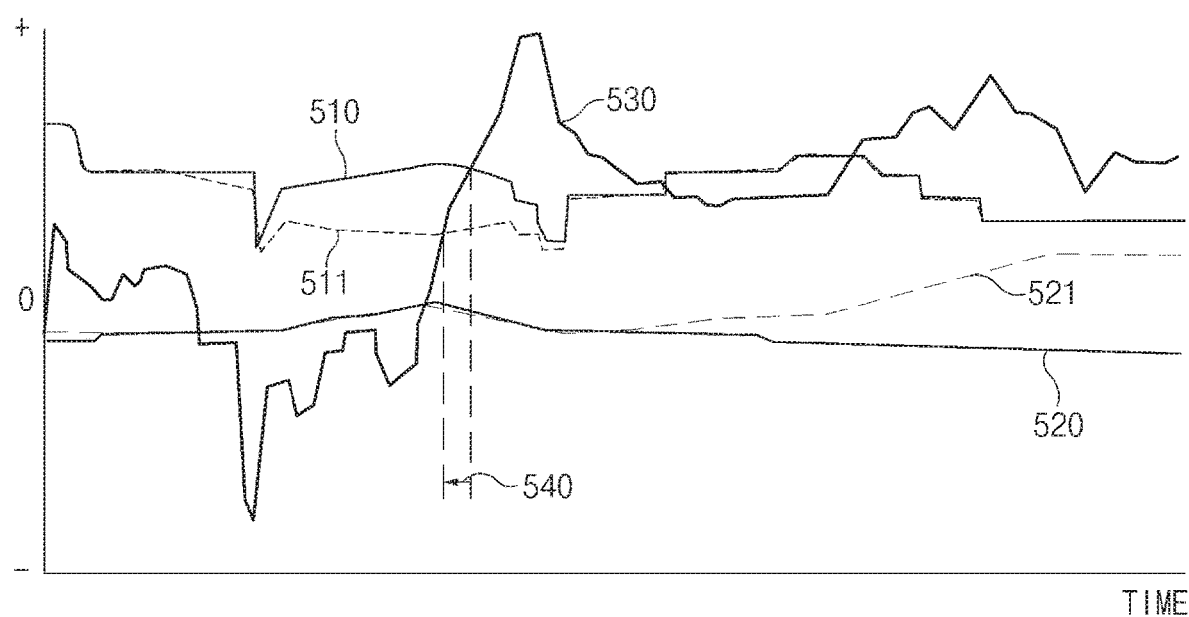
FIG. 5 is a view illustrating a map corrected by a hybrid vehicle controlling device, according to an embodiment of the present disclosure.

Furthermore, as illustrated in FIG. 5, the storage 10 may store a map in which both an on reference value 510 for determining the on-time of the engine and an off reference value 520 for determining the off-time of the engine are recorded. The technology for generating this map that has already been implemented in hybrid vehicles may be used in the embodiments in this disclosure. Thus, the detailed description thereof will be omitted.

In addition, the storage 10 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

Figure 2:
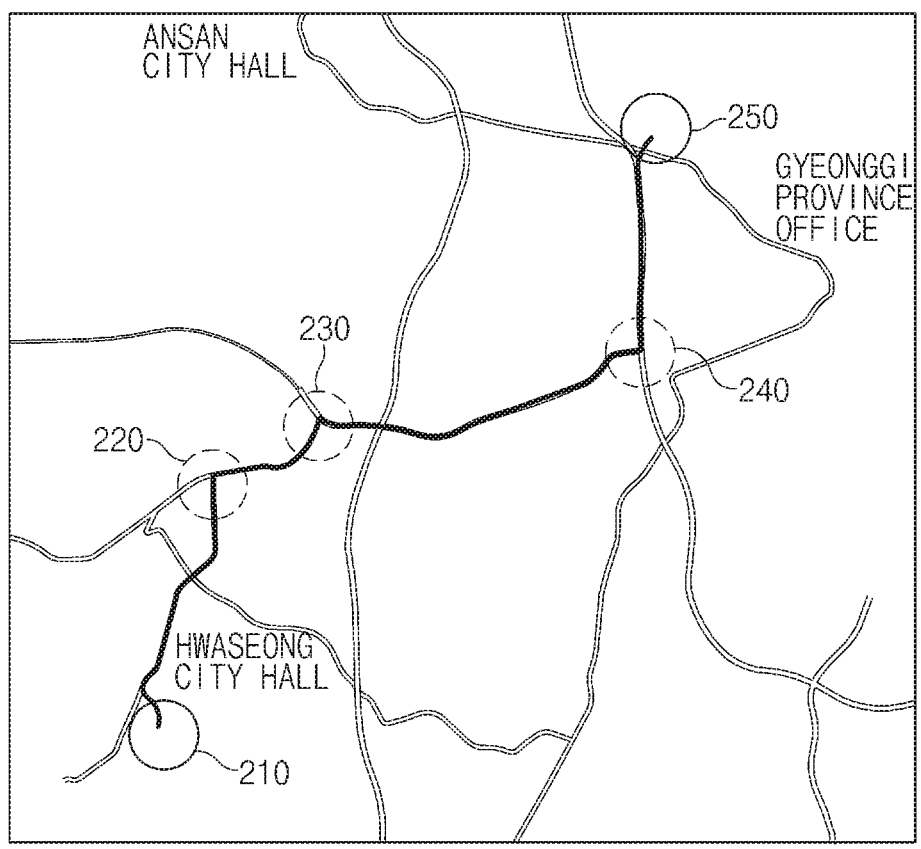
FIG. 2 is a view illustrating a route divided by a hybrid vehicle controlling device, according to an embodiment of the present disclosure.

Next, the navigation device 20 may be implemented with a navigation device mounted on a vehicle; the navigation device 20 may search for a route from the current location to the destination when receiving the destination information from the user and may set the route selected by the user among the found plurality of routes, as the driving route. For example, as illustrated in FIG. 2, the route set by the navigation device 20 may be a route from a starting point 210 to a destination 250.

Here, the navigation device may reset the route at an arbitrary node on the route at any time based on the amount of fuel consumption and real-time traffic information. In embodiments, in the route setting procedure, the navigation device may include calculating of the amount of fuel consumption that calculates the expected amount of fuel consumption of the link unit on the route from the starting point to the destination, measuring the actual amount of fuel consumption as a vehicle moves to the arbitrary node, resetting the route at the arbitrary node based on real-time traffic information when the difference between the actual amount of fuel consumption and the expected amount of fuel consumption exceeds a first threshold value, and when the difference does not exceed the first threshold value, resetting the route at the arbitrary node based on real-time traffic information when it is determined that the difference between the first expected arrival time and the second expected arrival time exceeds a second threshold value, by comparing a difference (hereinafter referred to as "first expected arrival time") in time between expected arrival time from the starting point to the destination and a time required from the starting point to the arbitrary node with an expected arrival time (hereinafter referred to as "second expected arrival time") from the arbitrary node to the destination.

Next, the transceiver 30 is a module that provides a communication interface with the server 200 managing the speed profiles of vehicles that are driving on each section for each section on a road; and the transceiver 30 communicates with the server 200 so as to obtain the speed profile for each section. At this time, it is desirable to obtain the speed profile for each section immediately before a vehicle enters the corresponding section.

Figure 3:
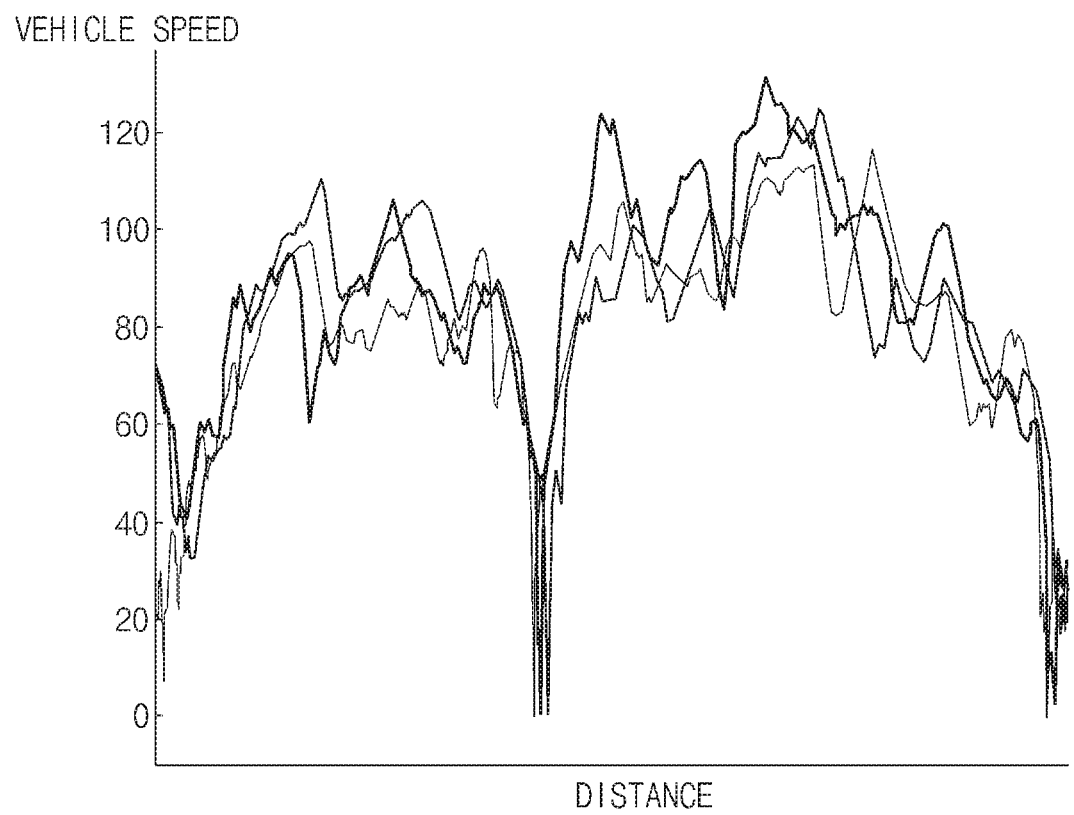
FIG. 3 is a view illustrating a plurality of speed profiles of a specific section received by a hybrid vehicle controlling device, according to an embodiment of the present disclosure.

In addition, the speed profile in a specific section on the road obtained by the transceiver 30 (e.g., section '210' to '220' in FIG. 2) is as illustrated in FIG. 3. In FIG. 3, an abscissa represents a specific section indicated by the distance, and an ordinate represents speed according to a distance. As understood through FIG. 3, the transceiver 30 may obtain a plurality of speed profiles.

Furthermore, the transceiver 30 may further obtain the average speed and average acceleration of the vehicles driving on the reference road, from the server 200.

Next, the controller 40 performs overall control such that each of the components is capable of normally performing functions of the components. The controller 40 may be implemented in the form of hardware or software, or may be the combination of hardware and software. Favorably, the controller 40 may be implemented as a microprocessor, but is not limited thereto.

The controller 40 may divide the route to the destination into a plurality of sections, receive a plurality of speed profiles for each section from the server 200, and may correct a map for determining the on-time and off-time of the engine based on the speed profile most similar to the driving style of the driver, and may perform various controls required to reduce the on-time of the engine by predicting the acceleration of the driver and to reduce the off-time of the engine by predicting the deceleration of the driver, based on the corrected map.

The controller 40 may control the storage 10 so as to store a map in which both the reference value 510 for determining the on-time of the engine and the reference value 520 for determining the off-time of the engine are recorded.

Moreover, the controller 40 may allow the transceiver 30 to obtain a speed profile for each section by communicating with the server 200 managing the speed profiles of the vehicles driving on each section for each section on a road.

In addition, the controller 40 may divide a route from a starting point to a destination, which is set by the navigation device 20, for each section. In embodiments, the controller 40 may divide the route starting from Interchange (IC), Junction (JC), a point at which the number of lanes increases, or a point at which the number of lanes decreases, or the like.

For example, as illustrated in FIG. 2, the controller 40 may divide the route 250 from a starting point 210 to a destination, into '210'~'220' being a first section, '220'~'230' being a second section, '230'~'240' being a third section, and '240'~'250' being a fourth section. At this time, '220' as a starting point is JC; '230' is an IC; and '240' is an IC.

Furthermore, the controller 40 may select one of a plurality of speed profiles obtained through the transceiver 30.

Hereinafter, a procedure in which the controller 40 selects one speed profile of a plurality of speed profiles will be described in detail First, the controller 40 may obtain a value $S_{xr}$ from subtracting the average speed of the host vehicle, which is driving on a reference road, from the average speed of vehicles driving on the reference road, which is obtained through the transceiver 30, and a value $S_{yr}$ from subtracting the average acceleration of the host vehicle, which is driving on the reference road, from the average acceleration of vehicles driving on the reference road, which is obtained through the transceiver 30. The location ($S_{xr}$, $S_{yr}$) thus obtained represents the location of the host vehicle on the coordinates ($S_x$, $S_y$). At this time, the reference road may include roads on which the host vehicle has driven at a previous time point.

Moreover, the controller 40 obtains the average speed of each of the speed profiles with respect to a plurality of speed profiles obtained through the transceiver 30 and obtains an average (hereinafter referred to as an average speed of a plurality of speed profiles) of the average speeds of the each of the speed profiles thus obtained.

For example, the controller 40 calculates the average speed of the first speed profile, calculates the average speed of the second speed profile, and calculates the average speed of the third speed profile, when obtaining three speed profiles (a first speed profile, a second speed profile, and a third speed profile) for the section that the host vehicle is scheduled to enter. The average of calculated average speed of the first speed profile, the calculated average speed of the second speed profile, and the calculated average speed of the third speed profile means the average speed of a plurality of speed profiles.

Afterward, the controller 40 obtains values $S_{x1}$, $S_{x2}$, and $S_{x3}$ from subtracting the average speed of each speed profile from the average speed of the plurality of speed profiles. In embodiments, the controller 40 obtains a value $S_{x1}$ from subtracting the average speed of the first speed profile from the average speed of a plurality of speed profiles, obtains a value $S_{x2}$ from subtracting the average speed of the second speed profile from the average speed of a plurality of speed profiles, and obtains a value $S_{x3}$ from subtracting the average speed of the third speed profile from the average speed of a plurality of speed profiles.

Moreover, the controller 40 obtains the average acceleration of each of the speed profiles with respect to a plurality of speed profiles obtained through the transceiver 30 and obtains an average (hereinafter referred to as an average speed of a plurality of speed profiles) of the average accelerations of the each of the speed profiles thus obtained.

For example, the controller 40 calculates the average acceleration of the first speed profile, calculates the average acceleration of the second speed profile, and calculates the average acceleration of the third speed profile, when obtaining three speed profiles (a first speed profile, a second speed profile, and a third speed profile) for the section that the host vehicle is scheduled to enter. The average of the calculated average acceleration of the first speed profile, the calculated average acceleration of the second speed profile, and the calculated average acceleration of the third speed profile means the average acceleration of a plurality of speed profiles.

Afterward, the controller 40 obtains values $S_{y1}$, $S_{y2}$, and $S_{y3}$ from subtracting the average acceleration of each speed profile from the average acceleration of the plurality of speed profiles. For example, the controller 40 obtains a value $S_{y1}$ from subtracting the average acceleration of the first speed profile from the average acceleration of a plurality of speed profiles, obtains a value $S_{y2}$ from subtracting the average acceleration of the second speed profile from the average acceleration of a plurality of speed profiles, and obtains a value $S_{y3}$ from subtracting the average acceleration of the third speed profile from the average acceleration of a plurality of speed profiles.

Afterward, the controller 40 displays the location ($S_{x1}$, $S_{y1}$) of the first speed profile, the location ($S_{x2}$, $S_{y2}$) of the second speed profile, and the location ($S_{x3}$, $S_{y3}$) of the third speed profile on the coordinates ($S_x$, $S_y$).

Figure 4:
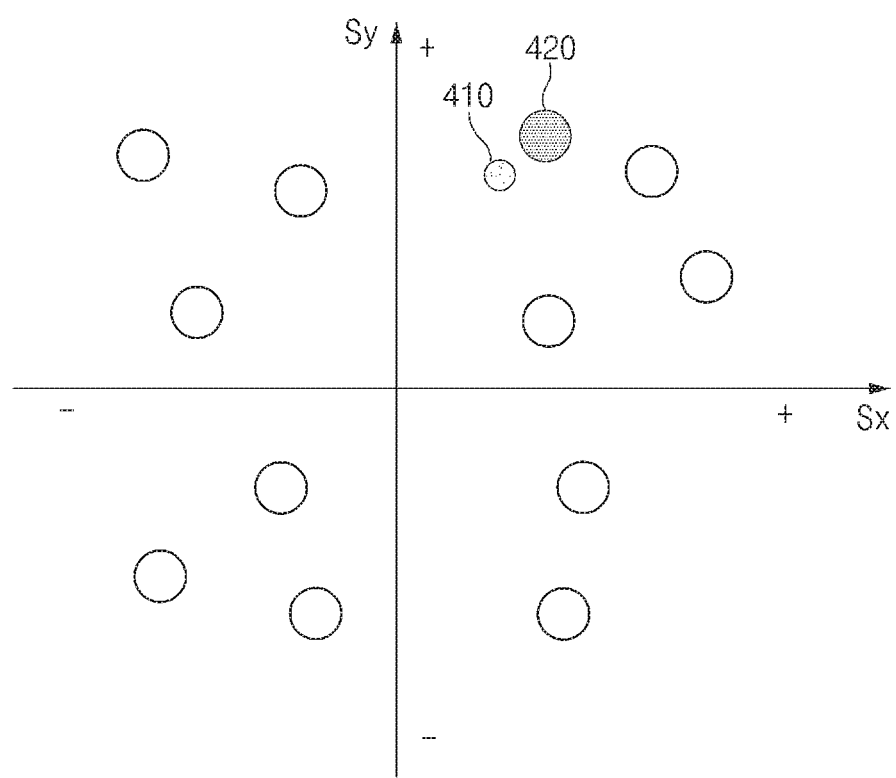
FIG. 4 is a view illustrating a procedure in which a hybrid vehicle controlling device selects one of a plurality of speed profiles, according to an embodiment of the present disclosure.

The location 410 of the host vehicle and the location of each speed profile displayed on the coordinates ($S_x$, $S_y$) are as illustrated in FIG. 4.

In FIG. 4, the speed profile closest to the location 410 of the host vehicle is '420'. Here, the location closest to the location 410 of the host vehicle means that the speed profile 420 has the highest similarity to the driving style of the driver of the host vehicle.

Afterward, the controller 40 selects the speed profile 420 of a plurality of speed profiles.

Hereinafter, a procedure in which the controller 40 corrects a map in which both the on reference value 510 for determining an on-time of an engine and the off reference value 520 for determining an off-time of an engine are recorded, based on the selected speed profile will be described with reference to FIG. 5.

The controller 40 corrects the reference value 510 for determining the on-time of the engine based on Equation 1 below and corrects the reference value 520 for determining the off-time of the engine based on Equation 3.

$$Ac1 = Ar1 - (Vp - Vn) \times F1 \quad \text{[Equation 1]}$$

Here, Ac1 may denote the corrected on reference value; Ar1 may denote an on reference value; Vp may denote a speed obtained from the speed profile; Vn may denote a current speed; F1 may be a factor for the on correction of an engine and may be calculated through the following Equation 2.

$$F1 = \max\{(\text{current } SOC - \text{reference } SOC), a\} \times Vn \times \max\{(Vp - Vn), 0\} \times G1 \quad \text{[Equation 2]}$$

Here, 'a' is a constant as a value indicating a lower limit value; G1 is a constant as a first gain value.

$$Ac2 = Ar2 + (Vn - Vp) \times F2 \quad \text{[Equation 3]}$$

Here, Ac2 denotes the corrected off reference value; Ar2 denotes an off reference value; F2 may be a factor for the off correction of an engine and may be calculated through the following Equation 4.

$$F2=\max\{(\text{current } SOC-\text{reference } SOC), a\} \times Vn \times \max\{(Vn-Vp), 0\} \times G2 \quad \text{[Equation 4]}$$

Here, 'a' is a constant as a value indicating a lower limit value; G2 is a constant as a second gain value.

The result in which the controller 40 corrects the on reference value 510 through Equation 1 may be equal to 511, and the result in which the controller 40 corrects the off reference value 520 through Equation 3 may be equal to 521.

In FIG. 5, '530' represents the required power of the driver, and '540' represents the case where the on-time of the engine is reduced by predicting the acceleration of the driver.

In the meantime, the controller 40 determines the on/off-time of the engine based on the corrected on reference value 511 and the corrected off reference value 521.

Figure 6:
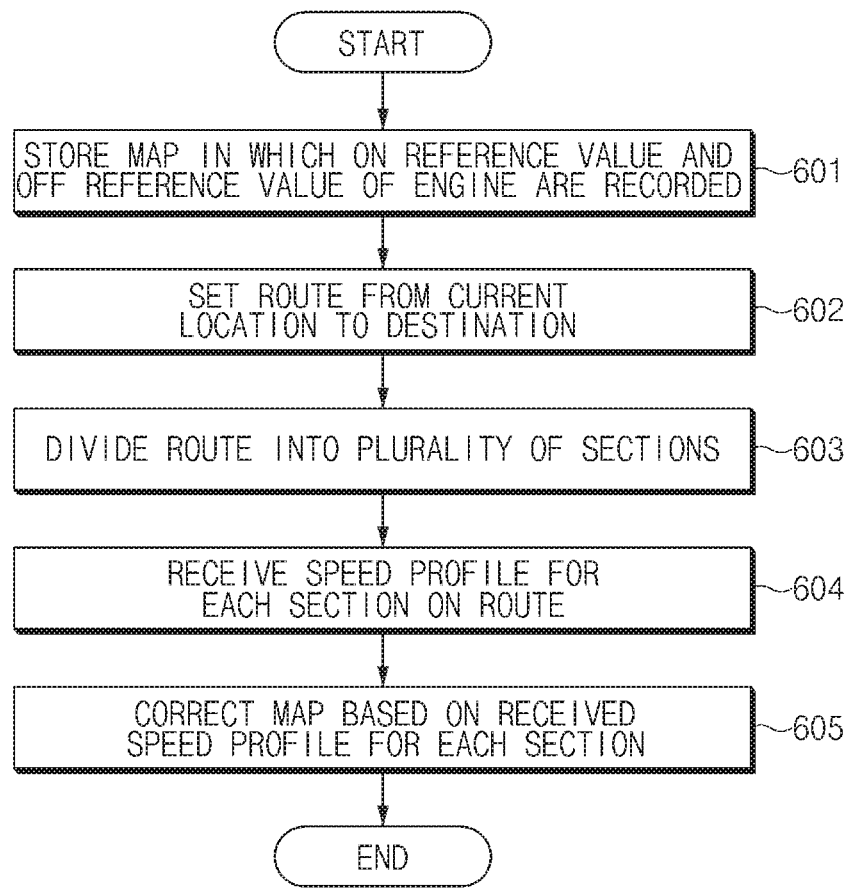
FIG. 6 is a flowchart of a method for controlling a hybrid vehicle, according to an embodiment of the present disclosure.

FIG. 6 is a flowchart of a method for controlling a hybrid vehicle, according to an embodiment of the present disclosure.

First, in operation 601, the storage 10 may store a map in which an on reference value and an off reference value of an engine are recorded.

Afterward, in operation 602, the navigation device 20 may set a route from a current location to a destination.

Afterward, in operation 603, the controller 40 divides the route into a plurality of sections.

Afterward, in operation 604, the transceiver 30 receives a speed profile for each section on the route.

Afterward, in operation 605, the controller 40 corrects the map based on the received speed profile for each section.

Through this procedure, the on-time of the engine may be reduced by predicting the acceleration of the driver, or the off-time of the engine may be reduced by predicting the deceleration of the driver.

Figure 7:
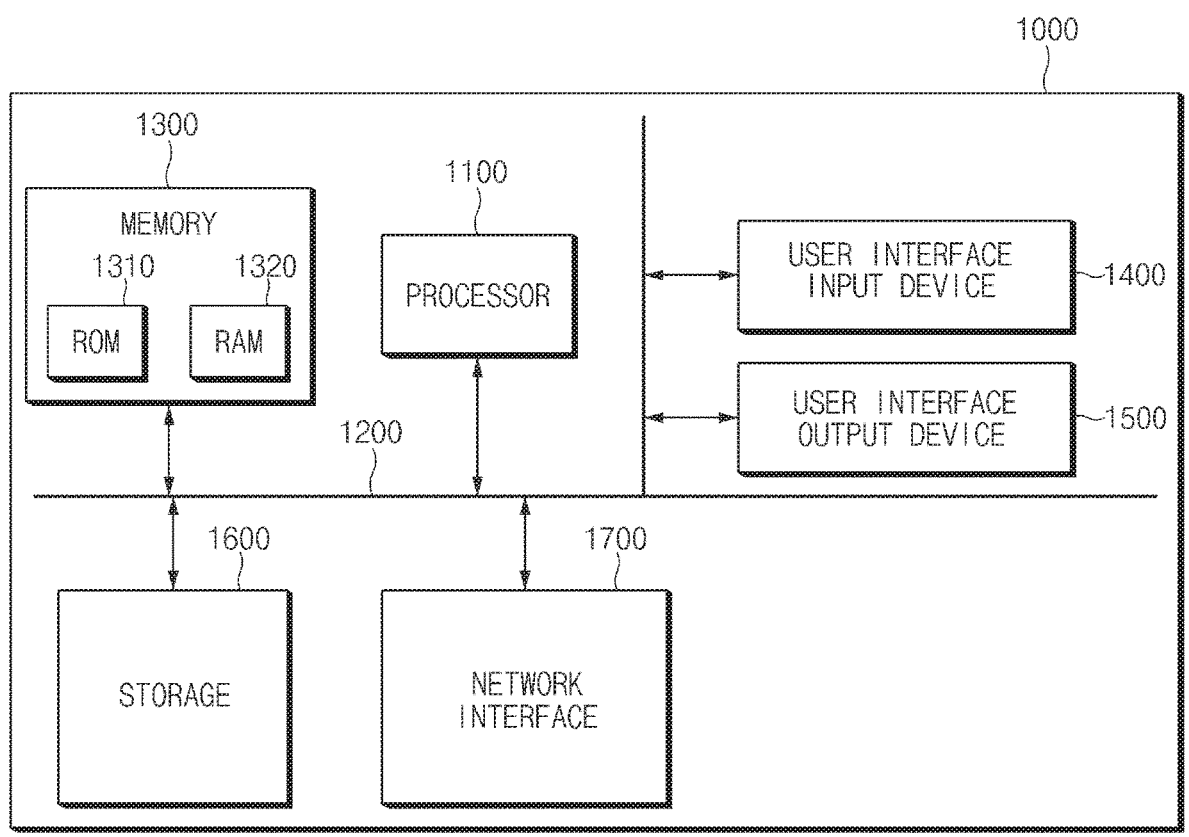
FIG. 7 is a block diagram illustrating a computing system that performs a method for controlling a hybrid vehicle, according to an embodiment of the present disclosure.

FIG. 7 is a block diagram illustrating a computing system that performs a method for controlling a hybrid vehicle, according to an embodiment of the present disclosure.

Referring to FIG. 7, the method for controlling the hybrid vehicle according to an embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, a device and a method for controlling a hybrid vehicle may divide the route to the destination into a plurality of sections, may receive a plurality of speed profiles for each section from a server, and may correct a map for determining the on-time and off-time of the engine based on the speed profile most similar to the driving style of the driver, and thus may reduce the on-time of the engine by predicting the acceleration of the driver and may reduce the off-time of the engine by predicting the deceleration of the driver.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Furthermore, according to an embodiment of the present disclosure, a device and a method for controlling a hybrid vehicle may reduce the on-time of the engine by predicting the acceleration of a driver, thereby providing satisfaction to the driver by improving the driving performance of a vehicle.

Moreover, according to an embodiment of the present disclosure, a device and a method for controlling a hybrid vehicle may reduce the off-time of the engine by predicting the deceleration of the driver, thereby improving the fuel consumption of the vehicle.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A hybrid vehicle controlling device comprising:
a storage configured to store a map in which an on reference value and an off reference value of an engine are recorded;
a navigation device configured to set a route from a current location to a destination;
a transceiver configured to receive a speed profile for each section on the route; and
a controller configured to:
divide the route into a plurality of sections;
correct the map based on the received speed profile for the each section,
when receiving a plurality of speed profiles of vehicles that are driving on the each section from a sever, select one speed profile the most similar to a driving style of a driver of a host vehicle, and operate the host vehicle based on the selected one speed profile;
wherein the transceiver is further configured to receive an average speed and an average acceleration of other vehicles that drive on a reference road; and
wherein the controller is further configured to:
display a value $S_{xr}$ obtained by subtracting the average speed of the host vehicle driving on the reference road from the average speed of the other vehicles driving on the reference road and a value $S_{yr}$ obtained by subtracting the average acceleration of the host vehicle driving on the reference road from the average acceleration of the other vehicles driving on the reference road, on coordinates ($S_x$, $S_y$) as a location of the host vehicle;
display a value $S_{x1}$ obtained by subtracting an average speed of a first speed profile from the average speed of the plurality of speed profiles and a value $S_{y1}$ obtained by subtracting an average acceleration of the first speed profile from the average acceleration of the plurality of speed profiles, on the coordinates ($S_x$, $S_y$);
display a value $S_{x2}$ obtained by subtracting an average speed of a second speed profile from the average speed of the plurality of speed profiles and a value $S_{y2}$ obtained by subtracting an average acceleration of the second speed profile from the average acceleration of the plurality of speed profiles, on the coordinates ($S_x$, $S_y$); and
select a speed profile positioned closest to the location of the host vehicle on the coordinate.

2. The hybrid vehicle controlling device of claim 1, wherein the transceiver is configured to:
receive a speed profile for a corresponding section at a time of entering the each section.

3. The hybrid vehicle controlling device of claim 1, wherein the controller is configured to:
divide the route starting from at least one of Interchange (IC), Junction (JC), a point at which a number of lanes increases, or a point at which the number of lanes decreases.

4. The hybrid vehicle controlling device of claim 1, wherein the controller is configured to:
correct the map based on the selected speed profile.

5. The hybrid vehicle controlling device of claim 4, wherein the controller is configured to:
correct the on reference value by subtracting a first value, which is obtained by multiplying a second value from subtracting a current speed from a speed of the speed profile by an on correction factor, from the on reference value.

6. The hybrid vehicle controlling device of claim 4, wherein the controller is configured to:
correct the off reference value by adding a first value, which is obtained by multiplying a second value from subtracting a speed of the speed profile from a current speed by an off correction factor, and the off reference value.

7. A method of controlling a hybrid vehicle, the method comprising:
storing, by a storage, a map in which an on reference value and an off reference value of an engine are recorded;
setting, by a navigation device, a route from a current location to a destination;
dividing, by a controller, the route into a plurality of sections;
receiving, by a transceiver, a speed profile for each section on the route;
correcting, by the controller, the map based on the received speed profile for the each section,
wherein the receiving includes, when receiving a plurality of speed profiles of vehicles that are driving on the each section from a sever, selecting one speed profile the most similar to a driving style of a driver of a host vehicle, and operating the host vehicle based on the selected one speed profile; and
receiving, by the transceiver, an average speed and an average acceleration of other vehicles that drive on a reference road;
wherein the selecting includes:
display a value $S_{xr}$ obtained by subtracting the average speed of the host vehicle driving on the reference road from the average speed of the other vehicles driving on the reference road and a value $S_{yr}$ obtained by subtracting the average acceleration of the host vehicle driving on the reference road from the average acceleration of the other vehicles driving on the reference road, on coordinates ($S_x$, $S_y$) as a location of the host vehicle;
display a value $S_{x1}$ obtained by subtracting an average speed of a first speed profile from the average speed of the plurality of speed profiles and a value $S_{y1}$ obtained by subtracting an average acceleration of the first speed profile from the average acceleration of the plurality of speed profiles, on the coordinates ($S_x$, $S_y$);
display a value $S_{x2}$ obtained by subtracting an average speed of a second speed profile from the average speed of the plurality of speed profiles and a value $S_{y2}$ obtained by subtracting an average acceleration of the second speed profile from the average acceleration of the plurality of speed profiles, on the coordinates ($S_x$, $S_y$); and
selecting a speed profile positioned closest to the location of the host vehicle on the coordinate.

8. The method of claim 7, wherein the receiving includes:
receiving a speed profile for a corresponding section at a time of entering the each section.

9. The method of claim 7, wherein the dividing includes:
dividing the route starting from at least one of Interchange (IC), Junction (JC), a point at which a number of lanes increases, or a point at which the number of lanes decreases.

10. The method of claim 7, wherein the correcting includes:
correcting the map based on the selected speed profile.

11. The method of claim 10, wherein the correcting includes:
correcting the on reference value by subtracting a first value, which is obtained by multiplying a second value from subtracting a current speed from a speed of the speed profile by an on correction factor, from the on reference value.

12. The method of claim 10, wherein the correcting includes:
correcting the off reference value by adding a first value, which is obtained by multiplying a second value from subtracting a speed of the speed profile from a current speed by an off correction factor, and the off reference value.

* * * * *